Patented Nov. 2, 1937

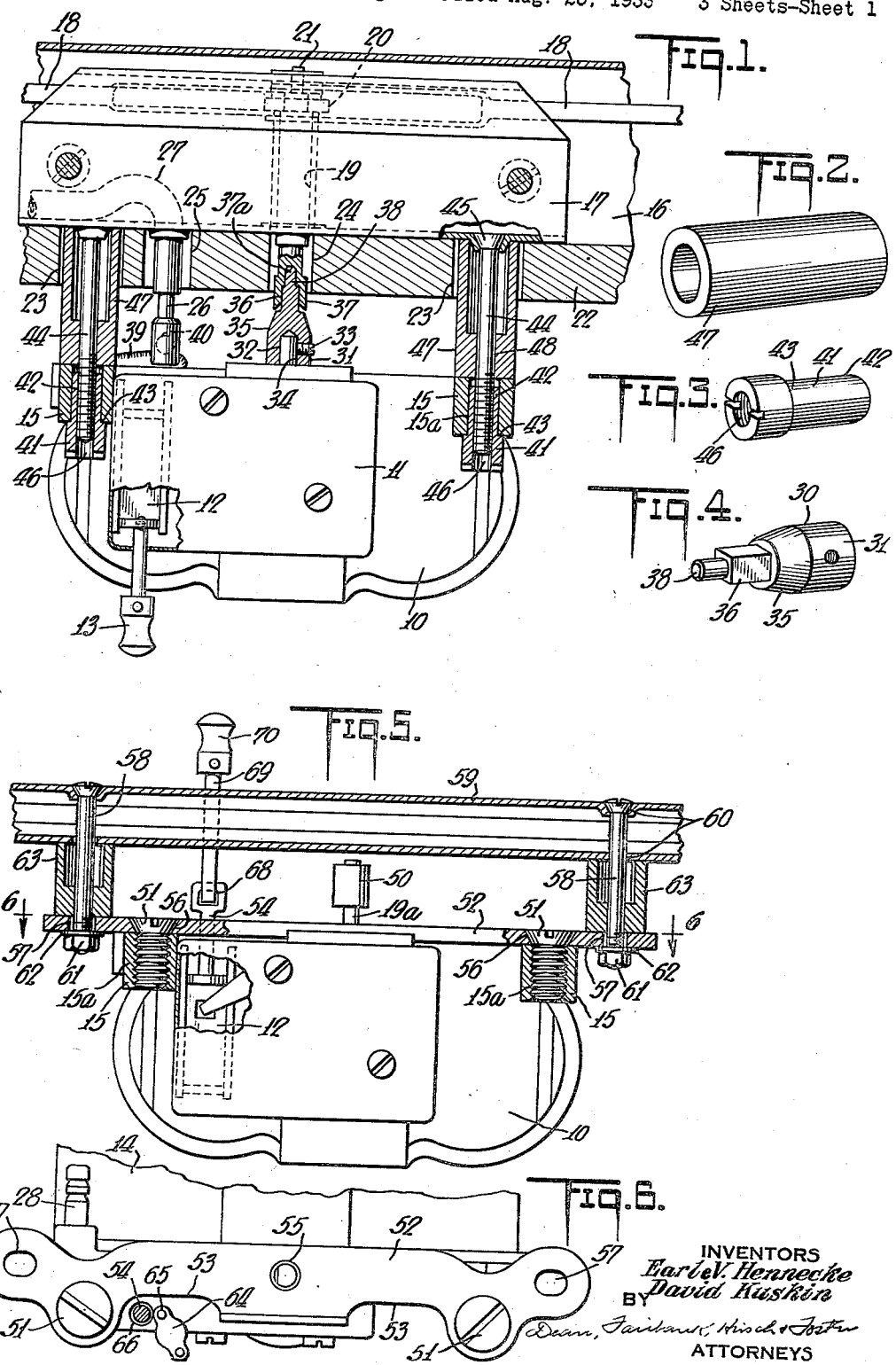

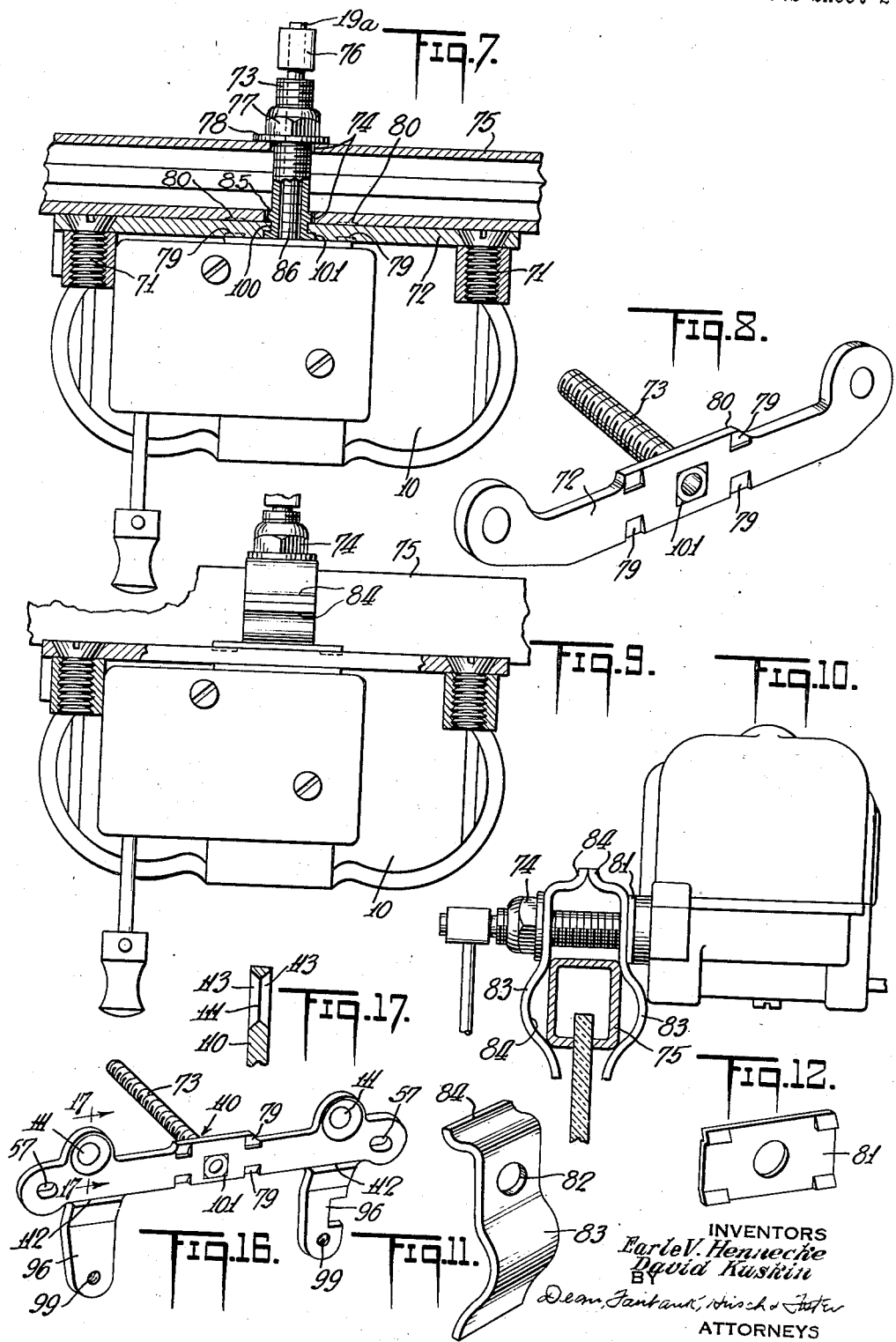

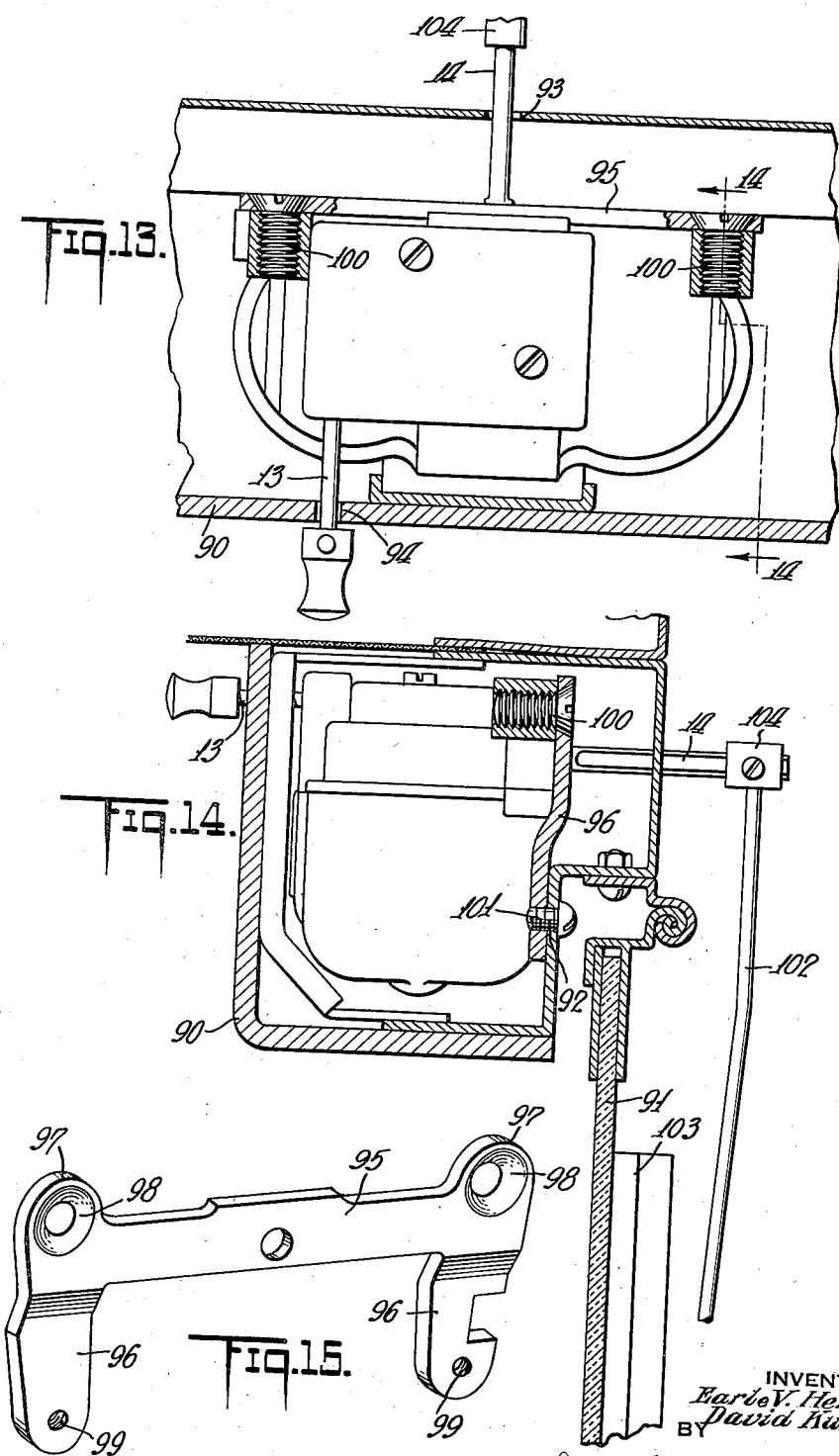

2,097,662

UNITED STATES PATENT OFFICE 2,097,662

UNIVERSAL MOUNTING FOR WINDSHIELD WIPER MOTORS

Earle V. Hennecke and David Kuskin, Flushing, N. Y., assignors, by direct and mesne assignments, to Franklin J. Foster, New York, N. Y., as trustee Application August 23, 1933, Serial No. 686,394
Renewed March 29, 1937

5 Claims. (Cl. 15—255)

Our present invention relates to means for conveniently mounting an auxiliary motor such for instance as a windshield wiper motor on or adjacent the windshield of a car.

Practically all cars and trucks are equipped at the factory with windshield wipers powered by an auxiliary motor of either of the electric or suction type, usually the latter. There has been no attempt to standardize windshields, windshield frames, header bars or other auxiliary wiper motor mounting apparatus by car manufacturers. The result has been that special types of motors and special types of mountings have been supplied to each car manufacturer. Some motors are mounted outside of the windshield, some are mounted inside of the windshield, some are concealed and some are not, the object of each manufacturer being to procure a motor and a motor mounting which will render the operating mechanism for the wiper as inconspicuous or as attractive or as cheap as possible while firmly securing it in position.

From the standpoint of the manufacturer who is turning out thousands of identical cars, such practice may be desirable but from the standpoint of the accessory dealer who is required to replace windshield wiper motors, the practice has proven highly undesirable since in order to completely supply the trade the dealer must carry in stock several score models and a complete line of wipers would involve stocking nearly two hundred different styles of motors to accommodate the trade if an exact duplicate of the worn or broken motor is to be used for replacement purposes.

Our present invention is primarily concerned with obviating this difficulty from the dealer's standpoint and with providing a motor which by means of a few simple adaptor attachments can be readily applied to nearly 100% of all of the automobiles now in use in the United States. Thus instead of stocking two hundred styles and types of motors, the dealer may stock a single standard motor and a few simple standard adaptor fixtures by which the motor may conveniently be applied to practically any make of car.

Another object of the invention is to accomplish this result while maintaining whatever standards may be set by the car manufacturers for concealed or inconspicuous motor mounts. Furthermore the cost of using our universal mounting arrangement is negligible as compared to the dealer's present costly practice of filling his shelves with dozens and dozens of motor types and still being unable to afford any proper mounting on certain types of cars.

Another object is to provide a set of adaptor fixtures, few in number, inexpensive in construction and capable of being so correlated with the motor and with the motor mounting part of the car, that expeditious and facile attachment of the motor may be readily accomplished.

Another object is to provide motor mounting means which while of simple construction, will be rugged, durable and efficient in use and which will afford a secure and if desired, a permanent mount for a windshield wiper motor.

While I prefer to apply the universal adaptor system to a light duty suction motor of the general character disclosed in Patent No. 1,912,777 issued to David Kuskin and Duncan A. McConnell on June 6, 1933, it is to be understood that similar adaptor systems might be used with various other types of suction or electric motors, notably the vane type and the piston type suction motors and the motion reversing or motor reversing types of electric motors.

Despite the great variation in the design of automobiles, if their windshield wiper motor mountings be considered independently of minute structural details of such mountings, they resolve themselves into but three types. (1) The outside motor mounting type where double support means must be provided for the motor at opposite sides of its wiper operating shaft and the shaft does not penetrate the windshield, header board or other part of the car but terminates between the motor and the outer face of the windshield or header board, and termed hereinafter for the sake of convenience, a two hole outside mount. (2) The most common type of inside motor mount wherein a single support means is provided for the center of the motor and the wiper operating shaft projects through this support means to move the wiper across the outer face of the windshield. With this type the support means is usually secured in the same opening through which the wiper driving shaft of the motor extends. It will be referred to hereinafter as a center hole mount. (3) An inside motor mount which corresponds in many particulars to the outside motor mount, that is to say, a mounting in which two anchorages or supports are afforded for the motor and the wiper operating shaft projects outwardly through the windshield frame or header board midway between the two motor anchorages. This type for descriptive convenience will be referred to hereinafter as a three hole inside mount.

Again waiving the details of such three general arrangements, it has always been considered essential to make the mounting means an integral part of the motor and to supply three separate types of motors for these three standard types of mountings. In addition to this, the mere fact that the mounting, anchoring or securing means for the motor always included parts which constituted an integral part of the motor, scores of variations of motor constructions have been resorted to, to meet the individual requirements of individual car manufacturers and individual car styles.

In accordance with the present invention we employ an adaptor system which will permit a standard motor to be quickly and conveniently and securely attached to a car using any of these three common types of motor securing, mounting or anchoring means or devices. While it is within the spirit of the invention to provide a single adaptor fixture, adapted with but minor variations to secure the motor in any of these standard mountings, we preferably employ a set of three primary adaptors, any of which may be selectively secured to the motor and conveniently anchored to or supported by the car without any alteration in the standard car construction. It will be understood that if the dealer prefers to keep the three main adaptor parts in stock rather than a single adaptor, it will not be necessary for him to stock any more adaptors than he stocks motors, but he can estimate the relative proportions of motors in use embodying the three general types of motor mountings and order his adaptors accordingly.

The convenience of such an arrangement to the tourist whose wiper is apt to break down hardly needs discussion. Suffice it to say that with this universal arrangement a tourist having a motor requiring replacement will be able to stop at even the smallest wayside dealer and procure a motor which will fit his car regardless of what type of car he may be driving and that such motor may be applied in but a few minutes.

It is within the scope of the invention to provide a single universal adaptor piece which is capable of being secured to the motor and to any motor support arrangement. In this case the main universal adaptor piece could be slightly trimmed off or unnecessary parts thereof removed if necessary or desirable before attaching the adaptor piece to the motor.

The invention may be more fully understood from the following description in connection with the accompanying drawings wherein:—

Fig. 1 is a view mainly in horizontal section taken through the header bar of a typical "General Motors" car such as a "Buick" utilizing a special type of three hole inside mount, and showing the manner in which one of the "Kuskin" type motors may be applied by a simple system of adaptors as a replacement for the type of motors used as standard equipment, Figs. 2, 3 and 4 are perspective views of the adaptor fixtures, Fig. 5 is a view similar to Fig. 1 but illustrating an adaptor arrangement for a typical standard two hole outside motor mount, Fig. 6 is a front elevational view of the lower part of the motor and its adaptors taken on the line 6—6 of Fig. 5, Fig. 7 is a sectional plan view showing the manner in which the motor may be applied to cars using a standard center hole inside mounting, Fig. 8 is a perspective view of one member of the adaptor used with this mount, Fig. 9 like Fig. 7 is a sectional plan view of another type of single hole mounting save that in this instance the motor shaft extends above instead of through the windshield frame and is secured partially by adaptor brackets, Fig. 10 is a side elevational view of the motor mount shown in Fig. 9 and with the windshield and frame in section, Fig. 11 is a perspective view of one of the brackets used in Fig. 10, Fig. 12 is a perspective view of an auxiliary adaptor fixture used in the mounting shown in Fig. 10, Fig. 13 is a sectional plan view showing how a motor can be mounted in concealed position within the header bar of a car, such mounting being typical of the standard "Essex" header bar construction and combining features of both the three hole and center hole inside mount, Fig. 14 is a transverse sectional view on the line 14—14 of Fig. 13, Fig. 15 is a perspective view of the adaptor bracket used in conjunction with this mounting, Fig. 16 is a perspective view of a universal adaptor bar embodying all of the features of the bar shown in Figs. 6, 8 and 15, and Fig. 17 is an enlarged transverse sectional detail on the line 17—17 of Fig. 16.

Referring first to Figs. 1 to 4 of the drawings, I have illustrated a standard windshield wiper motor of the general type illustrated in Patent No. 1,912,777 in greater detail in copending application of David Kuskin, Serial No. 671,980, filed May 20, 1933.

For purpose of the present disclosure it is sufficient to note that the motor includes a base casting 10 which mounts the parking mechanism on its under face, this parking mechanism being concealed by the dust cover 11 and including as an actuating element, a slide member indicated at 12 and at either end of which a handle 13 may be secured, this handle being push-pull control which regulates the main suction admitting valve. The motor mechanism itself is arranged upon or above the casting and is concealed by a dust cover 14 (Fig. 6).

The hollow header board construction illustrated in Fig. 1 is typical of the arrangement used in many "Buicks", "Chevrolets" and other types of "General Motors" cars where the motor has a variation of the "three hole inside mount" and drives either a single wiper or tandem wipers. The member which translates motion from our motor directly or indirectly to a wiper blade consists of a shaft 19a projecting laterally from one side of the casting. This shaft is oscillated by the motor and when the dealer receives it the shaft is quite long and is cut off by the dealer to the desired length in accordance with the particular type of car upon which the motor is to be mounted. Similarly the handle member 13 which is used for starting and stopping the motor is originally of excess length and is preferably of bendable metal so that it may either be cut off or in some instances bent into position for engagement by a supplemental actuating handle 69 (Fig. 5). Where said supplemental handles are used, the end of the member 13 is preferably provided with an eye 68 or some equivalent device for engagement attaching said handle.

The casting presents a pair of spaced ears 15 having internally threaded apertures 15a therein.

in some cases the holes need not extend entirely through the ears but threaded sockets are provided in lieu of the threaded apertures. These ears or sockets 15 constitute in every case the means by which the adaptor fixtures are secured to the motor.

In accordance with standard practice the hollow header bar 16 (Fig. 1) has secured thereunder a U-shaped bracket 17 and slidably mounted within this bracket is a push-pull bar 18, the ends of which are adapted to actuate one or two reciprocating or oscillating windshield wipers (not shown). Also mounted within the bracket and having one end accessible from the interior of the car is a transverse shaft 19 operating the push-pull bar 18 through the medium of a rocker arm 20 fixed upon the shaft 19 and pivotally connected to bar 18 as at 21. The inner plate or bar 22 of the header board is provided with a pair of openings 23 extending therethrough with a center opening 24 through which one end of the shaft 19 projects and a fourth opening 25 through which projects a nipple 26 connected interiorly of the header bar with a suction tube or pipe 27 and adapted to be externally connected with the main suction port 28. In the case of the particular type of motor here under discussion, the suction connection is made through an upstanding nipple 28 which lies closely adjacent to the dust cover 14 (Fig. 6).

With the exception of the motor the mechanism as thus far described, constitutes substantially the standard construction of the header board of this type of car. The use of a few simple adaptor fixtures permits the motor to be readily attached to the car as a replacement or as standard equipment.

In order to couple the shaft 19a to the shaft 19, we employ the adaptor illustrated in perspective in Fig. 4 and designated generally at 30. This adaptor includes a cylindrical portion 31 having a socket 32 therein adapted to be slipped over the shaft 19a and secured in place by set screw 33 working through the wall of the socket and preferably against a flat face 34 on the shaft 19a. Beyond the cylindrical socket portion 31, the adaptor 30 is externally tapered as at 35, this taper terminating in a squared extension 36 adapted to fit within the squared bifurcated end 37 of the shaft 19 and afford a keying and clutching connection between the shaft 19 and shaft 19a. The further reduced terminal end 38 of the adaptor 30 fits a socket 37a formed in the shaft 19 inwardly beyond the furcations 37.

A short length of flexible hose 39 bridges the space between the nipple 28 on the casting and the downwardly turned end of the nipple 26 which is attached to the car, such downwardly turned end being indicated in dotted lines at 40.

For supporting the motor casting and its associated parts we employ adaptor sockets 41 of the character shown in Fig. 3. The members 41 are externally cylindrical including reduced portions 42 defining annular external shoulders 43. Portions 42 are thrust home into the sockets 15 to an extent limited by the abutment of the shoulders 43 against the ends of the ears 15. Relatively long stud screws 44 extend outwardly through intermediate portions of the bracket 17 and through the apertures 23. Outward movement of the screws is limited by the engagement of their heads 45 with the intermediate portion of the channel plate 17 and the terminal ends of the screws screw into the internally threaded bores 46 of the adaptors 41. In order to limit the extent to which the stud screws may work into the adaptors 42, I employ spacer sleeves 47. These sleeves are preferably of an external diameter corresponding to the diameter of the ears 15. They each have a passage extending throughout their length which at one end is reduced as at 48 to correspond approximately in size with the shanks of the screws 44. These sleeves 47 extend through the openings 23 with one end abutting the bracket 17 and with the other end abutting the ears 15.

Inasmuch as this motor is mounted interiorly of the car, only a short handle member 13 need be provided for manual manipulation by the operator of the car. From the foregoing description it will be apparent that the problem of mounting one of the standard wipers herein illustrated in a car constructed in the manner illustrated in Fig. 1 may be expeditiously and easily accomplished and that when the motor mount has been effected, the motor will be firmly attached to the header board and the drive shaft will be effectively clutched to the shaft 19 which indirectly actuates the wiper actuating rod 18, the latter in turn oscillating or reciprocating a pair of tandem wipers (not shown) arranged beyond opposite ends of the wipers.

In Figs. 5 and 6 we have illustrated one of the standard wipers using a "two hole outside mount" secured by a simple adaptor mechanism to outside of header bar or the windshield frame. In this instance the motor is mounted outside of the windshield and the shaft end 19a extends inwardly from the motor toward the windshield terminating between the casting 10 and the windshield and the wiper blade (not shown) is carried directly by a suitable carrier member 50 fixed upon the end of the shaft 19a.

In this form of mounting a pair of screws 51 are used to attach an elongated flat stamped bar 52 upon the edge of the casting adjacent the windshield. The bar 52 is shaped to afford an opening or cut out 53 for the projecting control handle 54. It is also centrally apertured at 55 so that the shaft 19a may pass through it.

Preferably the openings in the bar through which the screws 51 pass are tapered at 56 to receive the screw heads and laterally beyond the opening which receive the screws, the extended ends of the bars are provided with apertures 57 therein adapted to receive bolts 58 for attaching the casting with its adaptor bar 52 to the windshield frame. This frame 59 is of tubular construction. It is provided with diametrically opposite apertures 60 through which the bolts 58 pass. Nuts 61 screwed onto the ends of the bolts press washers 62 against the apertured ends 57 of the bar 52, that is, the nuts are tightened to an extent limited by spacer sleeves 63 interposed between the ends of the adaptor bar and the frame 59.

Sleeves 63 are similar in construction to the sleeves 47 illustrated in Fig. 1 and may be of any desired length in accordance with the spacing required between the motor and the windshield. Such spacing must of course in any event be adequate to accommodate the shaft 14 which projects toward the windshield and carries the wiper arm.

In Fig. 6 there is disclosed a dust plate 64 pivotally secured as at 65 adjacent the opening 66 in the front of the casting through which the handle member for operating the parking device extends. Since this handle may be applied from either side of the casting, the dust plate on the side opposite the handle is normally swung to closed position to block the entry of dirt and dust under the dust cover 11. Fig. 5 also illustrates the manner in which a supplemental handle device may be employed in conjunction with the parking control mechanism. Here a short handle 54 having an eye 68 screws into the slide 12. The exact alignment of this handle with the handle 69 in the windshield frame is rendered unnecessary by making the eye of relatively large size and drilling a hole in the frame through which the supplemental handle 69 projects, said handle having a bent end which engages in the eye 68. It will be observed from Figs. 5 and 6 that the knob 70 with the handle 69 is disposed within the car so that the driver may have convenient access to it when starting or stopping the wiper actuating motor.

It will be readily apparent that the spacer sleeves 47 and 63 might be supplied in any length desired or that long sleeves might be shortened or that the sleeves might all be made of maximum length and transversely severed by the dealer to shorten them when shorter sleeves are required. The walls of these sleeves which encircle the enlarged portions of their bores are quite thin. Furthermore the sleeves themselves are preferably made of some soft metal so that they could be quickly cut through with a hacksaw if desired. It will be apparent that Fig. 5, like Fig. 1, illustrates an adaptor structure including parts to be anchored to the ears 15 and parts secured by the anchored element for attaching the motor at or adjacent the frame of the windshield.

Figs. 7 and 8 show an extremely simple adaptor arrangement to be used where the motor is mounted inside of the car and only a center hole mount for the motor is required. With this form of the invention, screws 71 corresponding to screws 51 of Fig. 5, serve to secure a flat, elongated adaptor bar 72 to the edge of the casting 10. The adaptor bar in this instance carries at its center a laterally projecting hollow externally threaded sleeve 73. This sleeve is adapted to pass through aligned apertures 74 in the windshield frame 75. The shaft 19a extends through the sleeve 73 and outwardly beyond the sleeve mounts the wiper arm carrier 76. In order to clamp the adaptor bar 72 which is rigid with the casting, against the inside of the windshield frame, it is merely necessary to screw a nut 77 onto the projecting end of the sleeve 73, a plate or washer 78 being preferably interposed between the nut and the outer face of the frame 75.

It will be observed that the adaptor bar near the center thereof is punched at a plurality of points to provide projections 80 on one face of the bar and corresponding recesses 79 at the other face of the bar. In Fig. 8 I have shown four of these punched out portions arranged in generally rectangular formation so that projecting portions may bite into the windshield frame and check any tendency for the motor to turn about its center hole mounting.

Here again the adaptor structure includes a device attached to the ears 15 and means associated with such device for securing the motor structure to the frame. Many methods might be employed for attaching the sleeve 73 to the adaptor bar 72. By observing the cross sectional shape of the center hole in the adaptor bar in Fig. 9 together with the showing of Fig. 10, it will be seen that the adaptor bar has an opening therethrough which is of increased diameter near one face of the bar. This increase in diameter may be effected by making the hole conical or by forming an enlargement in one end thereof. In either event the end of the sleeve 73 is spun over into interlocked relationship with the shoulder thus formed so that it is restrained against outward movement. With the adaptor bar in place of course, the casting itself blocks axial movement of the sleeve in the opposite direction. An advantage of having an enlarged opening of irregular shape is the fact that when the sleeve is spun or pressed out into engagement with the bar, it will be positively blocked against rotary as well as endwise movement in no one direction. In order to prevent disassembly of the sleeve and adaptor bar 72, it should be noted that a shoulder 85 defined by the reduced end of the sleeve abuts the outer face of the bar 72 to prevent the sleeve from being pushed all of the way through the bar in the opposite endwise direction.

The sleeve is of internal diameter exceeding the external diameter of the shaft and there is no danger of the shaft coming into contact with the interior of the sleeve due to the rigid mounting of the sleeve carrying bar 72 with respect to the casting 10 which in turn is fixed with respect to the oscillating shaft 14.

Figs. 9 to 12 inclusive show an adaptor mechanism which is in all respects identical with that of Fig. 7 save that the threaded sleeve 73 instead of extending through a hole in the windshield frame, extends above the windshield frame and passes through openings 82 in a pair of identical complementary bracket members 83 which embrace opposite sides of the frame bar 75 and have their upper ends 84 pressed tightly together as an incident of tightening the nut 77. The lower portion of the brackets may be shaped identically with the cross section of the windshield wiper bar or may, as shown in the illustrated embodiment of the invention, be bent to define opposed concave surfaces 84 which will accommodate practically any type of windshield frame bar.

It will be understood of course that the brackets 83 may be made of various shapes in order to snugly grip windshield frames of special cross sectional shapes. However the brackets which are illustrated here will in most instances afford an adequately effective gripping action.

Rectangular spacer plates 81, one of which is shown in perspective in Fig. 11 may be used between the innermost bracket and the adaptor bar 72 to space the motor inwardly far enough to clear the bulge in the bracket. Since the punched out and recessed portions of these plates correspond exactly to the punched out and recessed portions of the bar 72, one or more of the plates may be interposed between the adaptor bar 72 and the windshield frame 75 and nest snugly with each other and the adaptor bar. No matter how many plates are introduced, they are always interlocked with each other and through the bar 72 with the motor in such fashion that there can be no independent rotation of the plates. One of the plates or if no plates are used, the adaptor bar itself affords a relatively substantial bearing surface against the inside of the windshield frame to prevent localized deformation of the latter when the nut 77 is screwed tightly home.

The sleeve 73 may be severed at any point along this length to expose the end of the shaft 14, in accordance with the particular thickness of the windshield frame upon which the device is mounted.

Center hole mountings of the type illustrated in

Figs. 7 and 10 are typical of the method by which windshield wiper motors are secured to closed and open "Ford" cars.

Similarly with the type of mounting illustrated in Fig. 6 the best operation is obtained by spacing the shaft end a very definite distance from the windshield. With this form of the invention the shaft end is somewhat longer than the short shaft of Fig. 1 and the second saw guide mark shows exactly where the shaft would be cut when the motor is to be mounted as disclosed in Fig. 6 and by the use of the adaptors of Fig. 6.

In Figs. 13 to 15 we have shown another extremely simple type of adaptor construction designed to meet the similar peculiar requirements of standard "Essex" cars. With this type of mounting, the motor itself is completely concealed within the hollow header bar of cross bar 90 which is disposed within the car, adjacent and above the windshield 91. The problem here is to devise a set of adaptors which will permit the motor to be mounted in the restricted space afforded by the header bar design and without the need for providing any apertures other than those which are standard with this type of construction.

The lower portion of the hollow header piece is somewhat narrower than the upper portion and is set back from the windshield and it is ordinarily provided with a pair of openings 92 in its front face through which securing screws for a wiper motor are adapted to pass. Another aperture 93 is customarily provided in the front wall of the header piece above the windshield and through this opening the oscillating wiper shaft is adapted to project. A fourth opening 94 arranged near the top of the rear wall of the hollow header piece is adapted to provide clearance for movement of the control handle. This is another modification of the three hole inside mount.

The adaptor which we use includes a flat transverse bar illustrated in perspective in Fig. 15 and designated by the numeral 95. The ends of this bar are integrally connected with a pair of parallel leg portions 96, these legs extending slightly above the bar and a considerable distance below it. In the upper generally circular leg extensions 97 we provide counter sunk openings 98 and in the lower extremities of the legs we provide threaded apertures 99.

Screws 100 corresponding to the screws 71 of Fig. 9 and the screws 51 of Fig. 6 serve to attach the adaptor bar 95 to the motor, such screws passing through the openings 98 into the sockets 15 and having their heads accommodated in the countersinks of openings 98. The lower ends of the legs of the adaptor are then attached to the hollow header piece by screws 101 which are passed through apertures 92 and screwed into the apertures 99, thus rigidly supporting the motor structure in inverted position.

With the motor in this position the shaft 14 projects outwardly through the opening 93 and the arm 102 for the squilgee 103 may be attached to the projecting end of the shaft 14 in any convenient or conventional manner as for instance by the coupling 104. A control handle 13 corresponding to that of Fig. 1, passes through the opening 94.

From the foregoing it will be apparent that by the use of a single adaptor bracket and a couple of screws, the motor may be conveniently secured in concealed position within the header member without making any alterations in the header member itself.

We have referred to the handle 13 and corresponding elements throughout the specification as controlling a starting valve. With the particular type of motor illustrated in the pending application of Kuskin, above identified, such handle also controls the parking of the wiper blade as fully disclosed in application Serial No. 671,980 above identified but only as an incident of operation of the main control valve of the motor.

A careful analysis of the various types of mountings illustrated herein will disclose that in every instance the mounting means includes an adaptor secured directly to the motor casting and means for in turn securing the adaptor structure itself to the particular part of the car from which the motor is to be supported. In every instance the adaptor structure consists essentially of two elements which are attached or rigidly held with respect to each other, either integrally or separately and with one of those elements removably secured to the motor and the other of the elements removably secured to the car.

As suggested in the preamble to the specification, the purchase of a few of these simple adaptor forms will permit a dealer to apply a new windshield wiper motor to practically any standard type of car construction and without in any event necessitating the alteration of the car itself. In no instance is it even necessary to drill a special hole or in any way alter the standard construction of the car itself. From the standpoint of the dealer, a motor mechanism which is universally adapted for convenient application to practically any type of car, will entirely eliminate the need for stocking tremendous numbers of different types of motors and the cost of the adaptors themselves is but negligible as compared to the expense involved in purchasing and installing large stocks of wipers of many different styles upon which the dealer in most cases makes a very slow turn-over.

Referring to the adaptor shown in Fig. 16 it will be noted that it embodies in composite form, all of the structure of the adaptor of Figs. 6, 8 and 15. That is to say, this universal adaptor designated generally at 110, embodies legs 96 of the adaptor shown in Fig. 15 together with their screw holes 99. It also embodies the screw 73 shown in the adaptor of Fig. 8 and likewise the notches 79 shown in that figure. It furthermore embodies the projecting portions with their apertures 57 as illustrated in the adaptor of Fig. 6 and also mounting holes for mounting it on the casting. These holes are designated at 111 and they occupy the identical same position as the mounting openings of Figs. 6, 8 and 15. In connection with this universal adaptor it will be noted that the mounting holes of Fig. 5 are countersunk as at 56 from one face of the adaptor bar and the mounting holes of Fig. 15 are countersunk from the opposite face. With the universal adaptor bar of Fig. 16 we countersink both faces of the mounting hole as indicated at 113 (Fig. 17) thereby permitting countersinking or partial countersinking of the head of the screw regardless of which way the screw extends through the mounting openings 111.

The only portions of this universal adaptor which may prove unsightly with certain types of mounting are the legs 96 and preferably these legs are notched or weakened as indicated at 112. These notches appear at the point of juncture between the legs and the main adaptor bar and when the legs do not form a necessary part of the mounting they may be broken off by simply bending them back and forth.

Of course in addition to the desirability in some instances of breaking off the legs, it will frequently prove necessary to remove the screw 73. This screw may be conveniently removed by grasping it with a pair of pliers and pulling it out of its mounting hole, the metal of the hollow screw being soft enough so that the screw may be readily withdrawn. It will be understood of course that this metal, when the adaptor is in actual use, carries no substantial strain and there is no danger of inadvertently dislodging the screw if the universal adaptor of Fig. 16 is to form part of a center hole mount.

It will thus be seen that there is herein described apparatus in which the several features of this invention are embodied, and which apparatus in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

Having thus described our invention, what we claim as new and desire to secure by Letters Patent is:—

1. The combination with a windshield wiper motor including a pair of spaced hollow members to receive adaptor devices and including a driven shaft projecting from the motor between said members, of adaptor devices for securing said motor in operative position on or adjacent interiorly or exteriorly of the windshield frame or other mounting member, which affords either a single hole mount or a double hole mount, said adaptor devices including adaptor means to pass through the mounting hole or holes of the windshield frame or other mounting member and complementary adaptor means comprising a flat bar lying against the motor rigidly connected to said first adaptor means and to the spaced hollow members of the motor, said bar bridging the space between said hollow members and cut away to afford clearance for said shaft.

2. The combination with a windshield wiper motor having a pair of spaced internally threaded members adapted to receive mounting parts, of adaptor means for securing said motor upon a car adjacent the windshield thereof, said adaptor means including a bar, means engageable with the threaded members and bar for holding the bar and motor together, means associated with the bar for anchorage on or adjacent the windshield frame, the intermediate part of said bar having portions punched out to afford notches in one face of the bar and projections on another face of the bar to a correspondingly notched spacer plate adapted for nesting with the notches or projections of the bar and space the motor at the desired distance from the windshield.

3. The combination with a windshield wiper motor including a wiper actuating shaft and a pair of spaced internally threaded members adapted to receive mounting parts and disposed at opposite sides of said shaft, of adaptor means for securing said motor upon a car adjacent the windshield thereof, said adaptor means including a bar, means engageable with the threaded members and bar for holding the bar in position with respect to the motor, means associated with the bar for anchorage on or adjacent the windshield frame and including a pair of brackets adapted to embrace the windshield frame, said brackets including upwardly projecting portions having aligned apertures therein through which the wiper actuating shaft projects, an externally threaded sleeve fixed to the bar encircling the shaft and passing through the aligned apertures in the brackets and a nut engaging said sleeve for clamping the brackets on the windshield frame.

4. The combination with a windshield wiper motor including a pair of spaced hollow members to receive mounting fixtures and including a driven shaft projecting from the motor between said mounting fixtures, adaptor means for securing the motor in operative position on or adjacent to a windshield frame, said means including an adaptor bar, screws attaching the adaptor bar to the openings, a hollow externally threaded screw fixed to the bar encircling the shaft and adapted to pass through an opening in or adjacent the windshield frame, and of less length than the shaft, a nut for securing the screw in position, spacer means adapted for interposition between the bar and the windshield frame, said spacer means and said bar having nesting projections and recesses to prevent turning of the spacer with respect to the bar.

5. The combination with a windshield wiper motor including a pair of spaced hollow members to receive mounting fixtures and including a driven shaft projecting from the motor between said mounting fixtures, of a motor supporting adaptor bar, screws entering the hollow members and securing the adaptor bar to the motor, means for securing the adaptor bar in operative position on or adjacent a windshield frame, a concealed starting valve for the motor, said motor having openings therein at opposite sides thereof through which a valve handle is adapted to be selectively attached to the valve, said adaptor bar being cut away to expose the openings through which said handle is attached.

EARLE V. HENNECKE.
DAVID KUSKIN.